Feb. 28, 1933.  L. M. DIETERICH  1,899,139

PHOTOGRAPHIC PRODUCTION

Filed Dec. 29, 1925

Ludwig M. Dieterich
INVENTOR

BY Robert S. Blair
ATTORNEY

Patented Feb. 28, 1933

1,899,139

UNITED STATES PATENT OFFICE

LUDWIG M. DIETERICH, OF NEWARK, NEW JERSEY, ASSIGNOR TO THE DIETERICH CORPORATION, OF NEW YORK, N. Y., A CORPORATION OF NEW YORK

PHOTOGRAPHIC PRODUCTION

Application filed December 29, 1925. Serial No. 78,222.

My invention relates to the production of photographic images, and more especially it is contemplated to produce in a photograph the appearance of relief or three dimensional space by means of plural dimensional images prepared by my new and improved process.

It will be understood that photographic images as now produced lack perspective, or in other words, the objects reproduced photographically have a flat appearance as though located in a single plane and having extent in but two dimensions in the plane. Attempts have been made to create the illusion of relief in the case of single views by the use of photographs made by so-called stereoscopic cameras and viewed through instruments known as stereoscopes. In such cameras, there are taken two pictures of the same object, the sensitive surfaces on which the images are produced lying side by side and the light rays being focussed on the sensitive plates or films through lens systems, the axes of which are substantially parallel but in spaced relation. The negatives are then treated in the usual manner and the positive images are then mounted side by side in a specific way and viewed through two lenses. In this way, the illusion of perspective or three dimensional space is approximated by reason of the two views of the same object being taken from points in space slightly displaced relative to one another. This gives somewhat the effect that is observable by the human eyes, which by reason of their lateral displacement tend to create the three dimensional effect, the objects as is commonly said, "standing out from the background".

As has been explained, the creation of the illusion of relief has heretofore been commonly achieved only by the use of a pair of images simultaneously produced and observed, and obviously this arrangement is crude and accompanied by disadvantages inasmuch as views of single scenes must be seen through a stereoscope in order to give the effect. To adapt images so produced for use in slides for so-called stereopticons would involve other difficulties which need not now be discussed but which will upon consideration be obvious.

One object of my invention, therefore, is to provide a new and improved process by which images may be produced, in which single pictures will create the desired effect.

Another object of my invention is to provide a new and improved process by means of which images may be produced which create the appearance of relief and which give the desired effect without the necessity of providing additional devices through which the images are to be observed.

A further object of my invention is to provide a new and improved process by which single images may be produced capable in themselves of creating the appearance of relief, the images being adapted for projection in a stereopticon or moving picture projection machine, or equally capable of producing the appearance when used as so-called still pictures.

A further and more specific object of my invention is to provide a new and improved process by which photographic images may be produced, which singly create the appearance of relief, and which may be projected in the usual moving picture projection machine without modification.

Other objects and aims of the invention more or less specific than those referred to above, will be in part obvious and in part pointed out in the course of the following description of the steps and the relation of each step to one or more of the others thereof employed in carrying out my process, and the scope of protection contemplated will be indicated in the appended claims.

In the accompanying drawing, in which is diagrammatically shown one of various possible embodiments of the mechanical features of my invention, Figure 1 is a plan view partly in section of a lens system and objects to be photographed, certain parts being shown in their relative positions during one step of one embodiment of my process;

Similar reference characters refer to similar parts throughout the several views.

Figure 1:
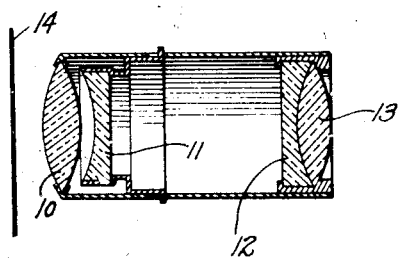
Figure 1:
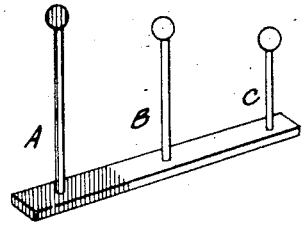

It will be understood, from a consideration of the art of photography as now practised, that in taking a picture, the camera is focussed on some particular plane of the object which is to stand out most clearly and distinctly in the final image. All the objects which may, for the sake of clearness be considered to be in this plane, will then be as clear and distinct as the main object while other objects lying on either side of the plane, that is, nearer to or farther from the sensitive surface will be more or less blurred or as is commonly said "out of focus". The plane through the object on which the camera is said to be focussed may be called a plane of sharpness and it is the object or portions thereof within this plane which shows most sharply and clearly in the image. Strictly speaking the surface referred to is not a plane but a spherical surface, the radius of curvature being so great relatively, however, that the slight sphericity may be disregarded.

It will be understood further that when an image is produced in which there are a number of objects, and the camera focused so as to reproduce a certain plane most sharply, the objects in this plane will appear in the produced image as of a relative size which will depend on the characteristics of the lens system, the size of the image, the distance of the sensitive surface from the plane of sharpness, etc., etc. If now, the camera remaining in the same position, the relative position of the lenses forming the system be changed thereby altering the focus of the lens system, and a new exposure made, the image of the same object appearing sharp on the sensitive surface will be of a size different from that of the original image that was achieved before the change was made. I have discovered, however, that it is possible, however, by moving the optical center of the lens system to produce a second image, that is to say, an image of a second plane of sharpness, in which the objects will register in size with the objects in the first image, and by combining two such images, it is possible to produce a single image in which there are two planes of sharpness, or in other words in which objects at two different distances from the sensitive surface are reproduced on the image with equal distinctness.

I have found that if a single image be produced by a combination of two images, which register throughout but which are taken with two different planes of sharpness, the effect is the creation of the appearance of relief. The creation of the appearance may be explained by the fact that the images though registering in size are taken with differing lens angles, and this gives the effect of natural relief. In viewing a scene, the eye naturally focuses upon a point on a single object, this point lying in a plane of sharpness as has previously been explained. The eye, however, will not continue to focus upon this point indefinitely but is directed continuously upon other points on the same object or on other objects in the scene within the range of vision. In other words, the eye wanders, automatically accommodating itself to the object to which the attention of the observer is directed, and as this variation in the focusing continues, the images which affect the retina, have continually changing planes of sharpness. In the pictures produced by my new and improved method, the image is built up of a series of images as explained and as the eye focuses upon different objects, it finds that these objects may be seen clearly, by reason of the building-up process in which images at varying planes of sharpness are combined. In this respect, my process gives the effect of natural relief as opposed to the artificial relief produced by the use of stereoscopic pictures viewed through stereoscopes.

In the latter case, there are taken two simultaneous pictures made by means of lenses slightly displaced in space. Both, however, are made at the same plane of sharpness so that when the complementary views which form the stereoscopic couple are observed, the natural tendency of the eye to wander results in focus being brought upon objects which are without the plane of sharpness at which the couple is taken. This results, upon continued observation, in eye-strain, manifesting itself in an unpleasant drawing sensation in the eye muscles. In the pictures produced by my process, however, no eye-strain results since the pictures simulate nature with almost perfect exactitude. The wandering of the eye, therefore, cannot lead to focusing upon objects which are without the plane of sharpness, and in this way, eye-strain is prevented and the pictures may be viewed for indefinite periods without tiring the observer. The objects in the two planes will appear in what may be called the built-up image, to be three-dimensional rather than flat or two dimensional. When two images produced in the manner described are combined, there is produced this appearance, as explained, but when three images which register throughout and which are taken at three different planes of sharpness are combined, the effect will be greatly enhanced. Now, if an infinite number of such images may be so combined, the effect will have been produced with the maximum possibility of the production of the appearance. This combination of an infinite number of superimposed registering images taken with infinitely varying planes of sharpness is made possible by my new and improved process as will now be explained.

When the camera is said to be focused on an object or more correctly on a plane, the lenses of the lens system of the camera are at a fixed distance relative to one another and the optical center of the system is at a fixed distance relative to the sensitive surface. If one of the lenses now is moved a slight distance relative to the other, the result will be an image in which there is another plane of sharpness, and furthermore the relative size of the objects in the image will have changed. If now in addition the optical center of the lenses is moved relative to the sensitive surface by a predetermined distance, which may be calculated mathematically and which will be dependent of course, on the change in relative lens position, then it is possible to produce an image in which there is another plane of sharpness, but in which the objects in the images will register throughout.

In the simplest method of practice, the lenses are placed in a certain relative position with the optical center at a certain distance from the sensitive surface. The shutter is opened for a period of time as required, whereupon the image is impressed on the sensitive surface. The shutter is closed and the lenses are now moved a slight distance relative to one another and the lens system then moved as a whole relative to the sensitive surface such a distance as may be required to keep the objects in registry. The shutter is again opened whereupon a second image is impressed upon the sensitive surface, or superimposed upon the first one, the two having or corresponding to different planes of sharpness. These steps may be repeated as many times as desired, each additional superimposed image adding to the effect.

If, however, the movement of the lenses relative to one another and the corresponding required movement of the optical center of the lens system relative to the sensitive surface be carried on simultaneously and continuously throughout the period of time that the shutter is open to permit the light rays to strike the plate or film, as the case may be, then the result is the production of a single image, built up of an infinite number of superimposed registering images of or corresponding to varying planes of sharpness, these producing the maximum effect.

The process described above will now be recognized as a process based on defocussing, the focal value of the system being changed. In the process herein set forth, however, the distance of the optical center of system is proportionately changed to correspond with the change in the focal value.

In the application of my new and improved process in the production of motion pictures in relief, I may take a series of separate pictures in which successive units of the series are of different planes of sharpness, the series of units or frames being then projected within a proper time interval so as to give the cumulative effect, or I may take pictures in a series in which each successive unit is a built-up image as already above explained. The appearance of relief in a picture is an appearance, and therefore if the same view but with different planes of sharpness is produced on sequential parts of the film, these succeeding views will be carried forward by the persistence of vision, and produce to the eye the same illusory effect, as if the picture were still and built up as described. It will now be understood that my new and improved process may be used in so-called still photography with equal facility, either by the combination of two or more images which register and which are taken with or correspond to different planes of sharpness or by the combination of an infinite number of such images. It is especially applicable and pleasing in connection with portraiture, but may be used in connection with either so-called snap-shot, or bulb, or time exposures.

It will be understood, of course, that the focal value of the lens system of a motion picture camera will vary as the lenses forming the system are relatively moved in an axial direction. The variation in the focal value by relative displacement of the lenses will in turn displace the optical center along the axis of the system, and it will now be clear that these two movements may be mechanically co-ordinated so as to maintain automatically the complete registry of images taken at different planes of sharpness.

While I have explained the carrying out of my new and improved process by reference solely to relative movements of the lenses and the optical center of the lens system, it will be clear that various other schemes may be devised by which the same results could be obtained. For example, instead of moving the lenses relatively to one another, the same result, in so far as this step is concerned, could be secured by moving the camera bodily. In this method, one picture or image of the particular object is first taken. The camera is then moved axially, and the lens system moved until the object appears in the second image, to be the same size as in the first. Upon taking a second picture over the first, there results an image built up of two images registering throughout but of two different planes of sharpness. These steps may be repeated as many times as desired, it now being clear that each additional superimposed image, corresponding to a different plane of sharpness, enhances and adds to the effect.

Or the same result might be produced by taking a picture, then moving the lens system and sensitive surface in the camera, the remaining steps being as in the method just described, or the lens system can be so calculated that the relative motion of one lens does not change the position of the optical center.

It is believed that, in view of the foregoing, the various steps of the various modes of carrying out my invention will be clearly understood but reference may be made to the accompanying drawing in order to achieve a clearer understanding of certain features of my invention. Referring first to Figure 1, I have illustrated diagrammatically a lens system which may be made up of a double convex lens 10 and a concavo-convex lens 11, movable in relation to each other, and spaced from these lenses is a second group of lenses comprising the concavo-convex lens 12 and its complementary double convex lens 13, all suitably mounted with respect to a sensitized camera element 14 such as a film plate or the like. Any suitable means may be employed to move the lens 11 along the optical axis and to move the entire lens system relative to the sensitive camera element 14 or to move the lens system and the camera element 14 as a unit toward or away from the scene to be photographed.

The scene to be photographed is represented by three objects A, B and C, all of the same size, spaced laterally from each other and also along the optical axis, as is clearly shown in Figure 1. The objects A, B and C may, for purposes of simpler illustration, take the form of disks supported upon a small rod or standard.

I first focus the lens system upon object A, and let it be assumed that the parts then assume the relative positions shown in Figure 1. If an exposure of the camera element 14 results, there are produced upon the latter three images AA, BB and CC, as shown in Figure 4; object A of Figure 1 being in the plane of sharpness of the camera appears sharp and clear, as is indicated by the heavy lined image AA of Figure 4; object B being more remote from this plane of sharpness, appears less sharp and clear, though smaller, as is indicated at BB in Figure 4, while the image CC on the film 14 of object C, which is still more remote from this plane of sharpness through object A, appears still less clear and sharp and still smaller.

Figure 2:
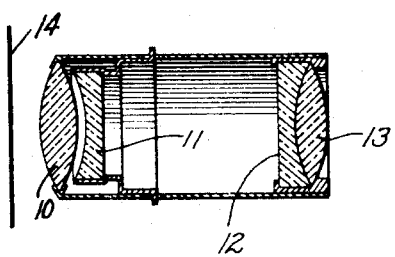
Figure 2 is a similar view showing the parts during another stage of my process.
Figure 2:
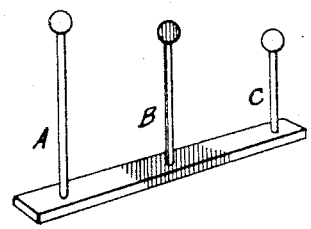

If now lens 11 is moved more closely to lens 10 so as to focus the camera upon object B, the plane of sharpness will have been moved from object A to object B but accompanying this change of focus there is a change of size of image; but this change of size of image I prevent from taking place by moving the lens system as a whole or by moving the lens system with the film 14 as a unit, along the optical axis to a sufficient extent to cause the image of object B, in Figure 2, to be of the same size as was the image of object B during the stage of my process above described and illustrated in Figure 1. This action results in images like those shown in Figure 5 in which image BB of object B is now sharp and clear, indicated by the heavier lines, but is of the same size as the image BB of Figure 4; images AA and CC of Figure 5 corresponding to the objects A and C, respectively beyond and within the plane of sharpness of the image B, appear less clear and sharp but of the same size that they respectively had in Figure 4.

Figure 3:
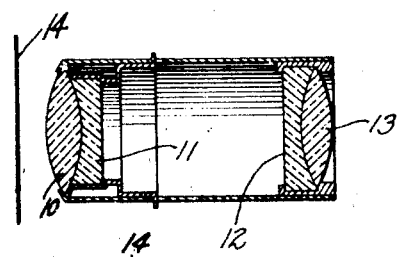
Figure 3 is a similar view showing the parts during another stage of my process.
Figure 3:
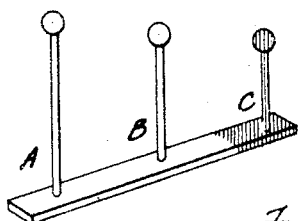
Figure 5:
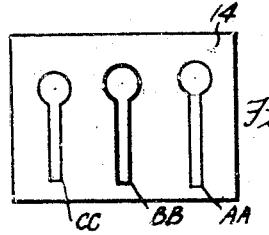
Figure 6:
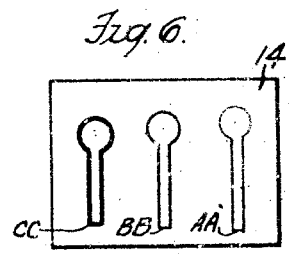

The changes above described are now repeated but this time with respect to object C, the parts assuming the positions shown in Figure 3 and with results indicated in Figure 6. In the latter figure the image CC of object C, the latter now lying in the new plane of sharpness, is sharp and clear but of the same size that the image had in Figures 4 and 5, while images BB and AA of objects B and A, in Figure 3, are, respectively, less and least clear, being, respectively, more and most out of focus during this step; though, however, there has been a change of focus at each stage or step, change of size of successive images of the same object is prevented, due to the re-allocation, along the optical axis, of the optical system as a whole with respect to the sensitized camera element 14 or of the entire optical system with the film 14 with respect to the object.

Figure 4:
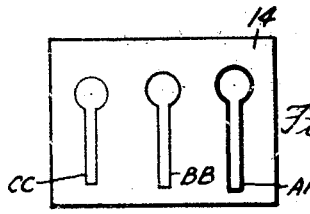
Figures 4, 5 and 6 represent diagrammatically certain results or actions on the film or sensitive camera element corresponding respective to the steps diagrammatically illustrated in Figures 1, 2 and 3.
Figure 7:
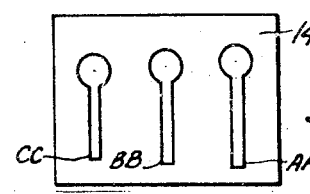
Figure 7 shows diagrammatically the final result or action on the film of the various steps of my process.

If the changes above described are effected continuously during the same exposure, the successive results or images indicated in Figures 4, 5 and 6 are superimposed upon one another with the result indicated in Figure 7 in which it will be seen that all of the objects, though of different distances from the camera appear sharp and clear and each image corresponds to a single plane of sharpness through that portion of the scene corresponding to the image. Or, if successive exposures of the same film are made, that is, one exposure for each of the groups of changes above described, the result is again like that indicated in Figure 7, being a composite on the same film of three sets of registering images.

Other means for obtaining the desired result will be obvious, in view of the foregoing, to anyone familiar with the science of optics and my process, as I have stated, may be successfully carried on in any of the ways suggested or in many others, singly or in combination.

I claim in this application that embodiment of my invention in the art of photography wherein movements of the lens system as a whole or of a component part of the lens system and of the camera as a whole are co-related, and make claim to the broader aspects of my invention as well as to embodiments herein disclosed but not herein claimed, all in my co-pending application Serial No. 216,357 filed August 30, 1927 as a continuation of the present application; I also make claim in my said co-pending application to the photographic element, film or plate which I, therefore, do not specifically claim in the present application.

As various possible embodiments might be made of the above invention, and as many changes might be made in the embodiments above set forth, without departing from the scope of the invention, it is to be understood that all matter hereinbefore set forth is to be interpreted as illustrative and not in a limiting sense.

I claim:

1. A method of creating the appearance of relief, which comprises exposing a sensitive surface to the action of light rays directed thereupon through a lens system to impress an image on said surface, moving the sensitive surface and the lens system together along the optical axis of said system, then varying the relative positions of said surface and an element of said lens system along the optical axis to a sufficient extent to maintain the same size of image as before, and again exposing said surface to the action of light rays, thereby to impress a second image on said surface registering throughout with said first-named image but having a different plane of sharpness.

2. The method of photography which consists in exposing a sensitive surface to the action of light rays emanating from portions of the scene or object that lie in a single plane of sharpness and directed upon the surface through a lens system, moving the lens system and sensitive surface along the optical axis in a direction toward or away from the scene or object, and simultaneously moving the lens system along the optical axis to an extent sufficient to cause the image for the new position of sensitive surface and lens system to be of the same size as before.

3. The method of photography which consists in exposing a sensitive surface to the action of light rays emanating from portions of the scene or object that lies in a single plane of sharpness and directed upon the surface through a lens system, moving the lens system and sensitive surface along the optical axis in a direction toward or away from the scene or object, and simultaneously moving the lens system relative to the sensitive surface, and correlating the said two movements so that the change in size of image of the scene or object resulting from one of said movements is negatived by the other of said movements.

4. The method of photography which consists in focusing a lens system upon portions of a scene or object lying in a given plane of sharpness to produce an image upon the sensitive surface of said portions, changing the position of the lens system and sensitive surface in a direction toward or away from the scene or object and changing the position of the lens system to the sensitive surface, and proportioning said changes so that other portions of the object or scene lying in a different plane of sharpness are focused upon the sensitive surface in such size that the new image of said first-mentioned portions registers with the initially produced image of said first-mentioned portions.

In testimony whereof, I have signed my name to this specification this 28th day of December, 1925.

LUDWIG M. DIETERICH.